Aug. 26, 1941.  R. P. HEUER  2,253,620
CHROME REFRACTORY BRICK AND THE METHOD OF MANUFACTURE THEREOF
Filed Nov. 5, 1938
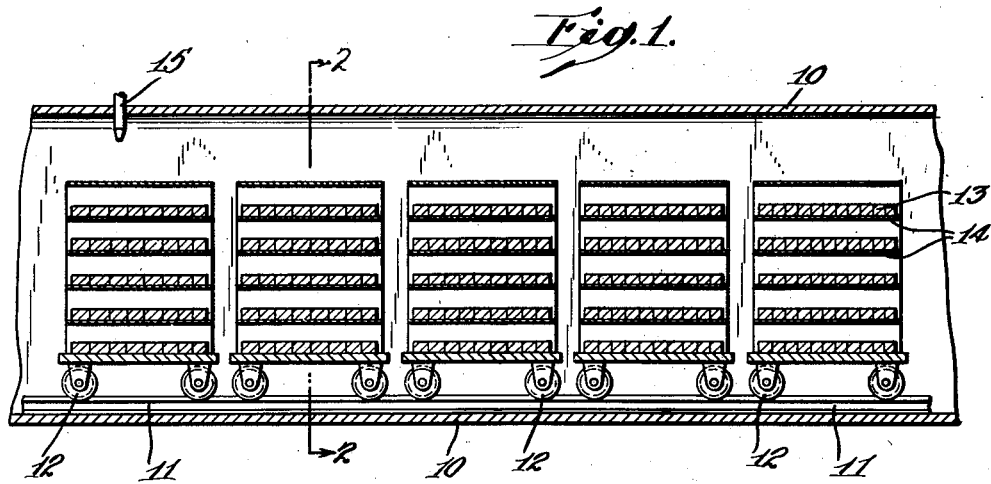
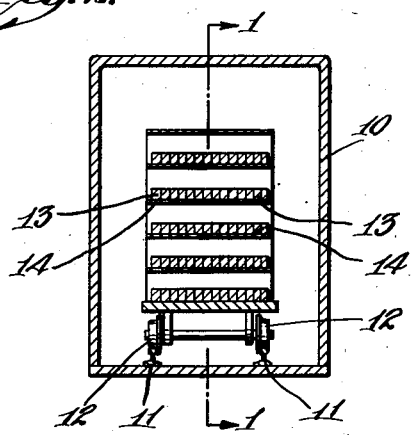
Inventor
Russell P. Heuer
Witnesses:

Patented Aug. 26, 1941

2,253,620

UNITED STATES PATENT OFFICE 2,253,620

CHROME REFRACTORY BRICK AND THE METHOD OF MANUFACTURE THEREOF

Russell Pearce Heuer, Bryn Mawr, Pa., assignor to General Refractories Company, a corporation of Pennsylvania Application November 5, 1938, Serial No. 239,039 In Great Britain April 25, 1938

10 Claims. (Cl. 25—156)

The present invention relates to refractory bricks composed principally of chrome ore and which are suitable for use in furnaces without previous firing in a ceramic kiln.

A purpose of the invention is to obtain more effective low temperature bonding of chrome brick to increase the strength during shipment and to give permanently increased strength to that portion of the brick which is far enough from the hot face so that it does not fully develop a high temperature bond during use in a furnace.

A further purpose is to specially cure chrome brick containing magnesia in the form of dead burned magnesite or periclase by subjecting the brick to an atmosphere substantially saturated with moisture, preferably at a temperature between 125° F. and the boiling point of water, desirably between 125° F. and 200° F., and for a prolonged period of time, suitably at least 8 hours and most desirably at least 12 hours.

A further purpose is to improve the distribution of a clay bond in a chrome brick containing magnesia such as dead-burned magnesia or periclase as a minor constituent by the use of kaolin.

A further purpose is to supplement a kaolin bond obtained in a chrome brick containing magnesia by addition of bentonite, or to replace the kaolin by bentonite.

A further purpose is to render the magnesia such as periclase or dead-burned magnesite more effective as a low temperature bonding agent in chrome brick which are to be used in a furnace without previous kiln-firing, thus obtaining bricks in many respects as satisfactory as fired chrome bricks, but at lower cost, with reduced manufacturing time, with more accurate finished dimensions and with better workmanship.

Further purposes appear in the specification and in the claims.

The invention relates both to the process and to the brick.

The drawing illustrates mechanism which may be used in practicing the invention.

Figure 1 is a central longitudinal section of a curing muffle, the section being a section on the line 1—1 of Figure 2.

Figure 2 is a section of Figure 1 on the line 2—2.

Chrome ore has been used as a raw material for the manufacture of refractory bricks which find extensive use in metallurgical furnaces and principally in basic open hearth furnaces for making steel. Such bricks have most frequently been made by grinding the chrome ore, mixing it with water, forming the mixture into bricks under pressure and burning the resultant product in ceramic kilns to temperatures of 1500° C. (2732° F.) or higher. A typical chemical analysis of chrome ore for the manufacture of bricks is

| | Per cent |
|---|---|
| $Cr_2O_3$ | 40.0 |
| FeO | 13.0 |
| MgO | 19.0 |
| $Al_2O_3$ | 21.0 |
| $SiO_2$ | 5.0 |
| Total | 98.0 |

Such a chrome ore contains a substantial quantity of silica which is combined in the form of magnesium and other silicates. In making bricks from such ore, these silicates have been helpful in developing a bond between the chrome ore grains when the bricks are subjected to firing in kilns. For high temperature uses, however, it has been found that the presence of these silicates is detrimental to the brick due to their lower fusion temperature.

It is desired by the present invention to obtain more effective low temperature bonding from magnesia such as dead-burned magnesite or periclase which is used in chrome brick. To do this, the bricks are "cured" prior to drying by subjecting them for an extended period to a moist atmosphere at an elevated temperature below the boiling point of water at the particular pressure.

In practicing the invention the chrome ore is first ground to pass a screen having 5 mesh per linear inch, the wire diameter being 0.068 inch. The periclase or dead-burned magnesite to be added should contain more than 70% MgO and preferably about 90% MgO. Its silica content should be low and for best results not over 5%. Ferric oxide should be present preferably about 4% but may vary between 1% and 10%. A typical analysis is

| | Per cent |
|---|---|
| MgO | 90.0 |
| $SiO_2$ | 3.0 |
| $Fe_2O_3$ | 3.0 |
| CaO | 1.5 |
| $Al_2O_3$ | 1.5 |
| Total | 99.0 |

The magnesite is desirably ground to pass a screen having 100 mesh per linear inch and wire diameter 0.0041 inch. Fine grinding is desirable since it aids in increasing the strength of the finished brick. For best results sufficient dead-burned magnesite should be added to the refractory mix to cause at least 15% of magnesite to be present in the finished brick. For most uses the desired amount of magnesite is 25% but this may be increased to 35% or more. If amounts in excess of 35% magnesite are used, it is desirable to use finely ground magnesite up to 25%–35% and add the balance as coarsely ground material.

It will be evident that the principles of the invention in regard to curing may to advantage be applied to chrome brick manufactured in accordance with my United States Patents Nos. 1,845,968 and 2,087,107, and that the principles of grain sizing and combining as outlined in my United States Patent No. 1,851,181 may also be employed.

As a bonding material for the chrome ore-magnesite mixture, finely ground kaolin is added, preferably ground to pass a screen having 200 mesh per linear inch, wire diameter 0.002 inch, in amount equal to 1% to 5%. This mixture of chrome ore, magnesite and kaolin is desirably prepared in a wet pan. In order to temper the mix for brick making, an aqueous solution of sulphuric acid is incorporated in the wet pan. Under this treatment the sulphuric acid, magnesite, kaolin and magnesium silicates in the chrome ore react to form a colloidal material which coats the particles of chrome ore and, after proper treatment prior to and during drying, forms a strong bond which is effective without kiln-firing.

It has been found experimentally that kaolin distributes throughout the brick mix more readily and coats the brick particles with finer clay particles than in the case of the ball clay previously used. Bentonite has also been found to be preferable to ball clay in the above respects and desirable for use in addition to or instead of kaolin.

The kaolin may be made more effective by the addition of small amounts of finely ground bentonite. Or if desired, the kaolin may be reduced or entirely eliminated and in its place bentonite may be used. Depending upon the amount of kaolin used and the amount and character of silicate impurities present in the chrome ore, the amount of bentonite desired may vary from 0.1% by weight of the total mix to 3% or more.

The prepared mix in the wet pan should contain about 3% water. The strength of the sulphuric acid solution may be adjusted so that the amount of acid added to the mix is between 0.5% and 2%, desirably for most uses about 1%. A solution of 22° Bé. will provide acid and water in the proper ratio to give 3% water and 1% acid in the tempered mix. After tempering, the mixture is formed into the desired refractory bricks under pressure exceeding 1000 pounds per square inch. In order to avoid subsequent shrinkage of the bricks during furnace use it is necessary to obtain high density in the bricks as they come from the forming press. Preferably the press should be capable of exerting between 10,000 and 15,000 pounds per square inch on the bricks so that the apparent specific gravity at room temperature of the finished bricks after drying is in excess of 3.04.

The pressed bricks are placed on pallets on drying cars and are dried to remove the excess of water present. In order to develop the proper bond without kiln-firing it is desirable that the bricks be subjected to a special "curing" treatment before the excess water is eliminated. In the curing treatment the bricks are heated to a temperature between 125° F. and the boiling point of water, desirably between 125° F. and 200° F. and preferably to 180° F. whilst the excess water is still retained in the bricks. This treatment is accomplished by placing the drying cars in a muffle whose atmosphere is maintained as close to saturation as possible by admitting free steam into the muffle, or bringing the air of the muffle into contact with water for humidification either in the muffle or outside. This treatment should be maintained preferably for 12 hours, during which time the dead-burned magnesite forms in part a magnesium hydrate, which in turn reacts during the subsequent drying operation to form the desired bond. The "cured" bricks are then dried by treating them to 250° F. to 300° F. in a normal atmosphere of low humidity for 18 to 24 hours until their weight becomes approximately constant. The dried bricks thus produced have a crushing strength at room temperature in excess of 5000 pounds per square inch and frequently as much as 10,000 pounds per square inch or more.

The drawing shows a curing muffle of the tunnel type having walls 10 and provided with a track 11 along which cars 12 are progressed. The cars carry the bricks 13 on suitable trays 14. Steam introduced into the muffle through the jet 15 maintains the atmosphere of the muffle close to saturation. It will be evident of course that it is undesirable to have appreciable moisture precipitating in the muffle. The muffle may be provided with vestibules to permit continuous operation, or it may be operated intermittently.

The bricks can be used in furnace construction without kiln firing. Due to the lack of vitreous bonding substances which are usually present in kiln-fired bricks, these unfired bricks spall less than fired bricks. During use certain parts of the bricks are exposed to highest furnace temperatures, other parts are exposed to lower temperatures. It is therefore necessary that the bonding substances function properly at these different temperatures. The magnesite-kaolin-sulphuric acid combination is a desirable one for this purpose. The natural occurring silicates in the chrome ore cooperate with the added magnesite and the kaolin. For best results on a chrome ore of the analysis previously given, about 2% of kaolin is desired. As the amount of silicates in the chrome ore decreases the amount of kaolin may desirably be increased and vice versa with increasing silicate content in the chrome ore. The presence of colloidal silicates is desirable for obtaining the proper bond. The natural occurring silicates plus the added kaolin provide the required silicate content.

The bricks thus produced may be used in furnaces where highest temperatures are encountered as, for example, open hearth furnaces for steel production. In such furnaces they give desirable service in front walls, backwalls, ports, air and gas flues, roofs, etc. Due to their better resistance to spalling, lower thermal conductivity and more accurate dimensions when compared with kiln-fired brick, they are particularly suited for the construction of suspended roofs. The bricks may also be used in metallurgical furnaces operating at lower temperatures as, for example, copper melting furnaces, heating furnaces, soaking pits, etc.

In view of my invention and disclosure variations and modifications to meet individual whim or particular need will doubtless become evident to others skilled in the art, to obtain all or part of the benefits of my invention without copying the process and product shown, and I, therefore, claim all such in so far as they fall within the reasonable spirit and scope of my invention.

Having thus described my invention, what I claim as new and desire to secure by Letters Patent is:

1. The method of manufacturing refractory brick composed principally of chrome ore and suitable for use in a furnace without kiln firing, which comprises grinding the chrome ore to pass a screen having 5 mesh per linear inch, mixing the chrome ore with water, sulphuric acid in amount between 0.5% and 2% and more than 15% of dead-burned magnesite, pressing the mixture into bricks under pressure exceeding 1000 pounds per square inch, heating the brick for at least eight hours at a temperature between 125° F. and the boiling point of water in an atmosphere substantially saturated with moisture before the excess content of moisture is removed and subsequently applying heat to remove the excess moisture content.

2. In the method of manufacturing refractory brick composed principally of chrome ore and containing magnesia as a minor constituent, with water and, with water, clay and sulphuric acid, and suitable for use in a furnace without kiln-firing, the step which consists in curing the sulphuric acid bond in the brick in an atmosphere substantially saturated with water at a temperature between 125° F. and the boiling point of water for a time of at least twelve hours.

3. The method of manufacturing refractory bricks composed principally of chrome ore and suitable for use in a furnace without kiln-firing, which comprises mixing chrome ore with water, sulphuric acid, clay and magnesia, pressing the mixture into bricks and curing the bricks for at least twelve hours in an atmosphere substantially saturated with moisture at a temperature exceeding 125° F. and below the boiling point of water prior to removal of the excess moisture content.

4. The method of manufacturing refractory brick composed principally of chrome ore and suitable for use in a furnace without kiln-firing, which comprises grinding the chrome ore to pass a screen having 5 mesh per linear inch, mixing it with water, sulphuric acid in an amount between 0.5% and 2%, kaolin in amount between 1% and 5% and more than 15% of magnesia, pressing the mixture into brick under pressure exceeding 1000 pounds per square inch, heating the brick for at least twelve hours in a temperature between 125° F. and the boiling point of water in an atmosphere substantially saturated with moisture before the excess content of moisture is removed and subsequently heating in a drier atmosphere to remove the excess moisture content.

5. The method of manufacturing refractory brick composed principally of chrome ore and suitable for use in a furnace without kiln-firing, which comprises grinding the chrome ore to pass a screen having 5 mesh per linear inch, mixing it with water, sulphuric acid in amount between 0.5% and 2%, kaolin in amount between 1% and 5%, bentonite in amount between 0.1% and 3%, and more than 15% of magnesia, pressing the mixture into bricks under pressure exceeding 1000 pounds per square inch, heating the bricks for at least twelve hours at a temperature between 125° F. and the boiling point of water in an atmosphere substantially saturated with moisture before the excess content of moisture is removed and subsequently continuing the heating to remove the excess moisture content.

6. A refractory brick composed principally of chrome ore and suitable for use in a furnace without kiln-firing, comprising in addition to the chrome ore, magnesia, sulphuric acid and kaolin.

7. A refractory brick composed principally of chrome ore and suitable for use in a furnace without kiln-firing, comprising chrome ore of 5 mesh per linear inch, sulphuric acid in amount between 0.5% and 2%, kaolin in amount between 1% and 5% and more than 15% of dead-burned magnesite, the brick having a crushing strength at room temperature in excess of 5000 pounds per square inch and an apparent specific gravity at room temperature in excess of 3.04.

8. A refractory brick composed principally of chrome ore and suitable for use in a furnace without kiln-firing, comprising in addition to the chrome ore, magnesia, sulphuric acid and bentonite.

9. A refractory brick composed principally of chrome ore and suitable for use in a furnace without kiln-firing, comprising chrome ore of 5 mesh per linear inch, sulphuric acid in amount between 0.5% and 2%, bentonite in amount between 0.1% and 3% and more than 15% of dead-burned magnesite, the brick having a crushing strength at room temperature in excess of 5000 pounds per square inch and an apparent specific gravity at room temperature in excess of 3.04.

10. A refractory brick composed principally of chrome ore and suitable for use in a furnace without kiln-firing, comprising chrome ore of 5 mesh per linear inch, sulphuric acid in an amount between 0.5% and 2%, kaolin in amount between 1% and 5%, bentonite in amount between 0.1% and 3% and more than 15% of dead-burned magnesite, the brick having a crushing strength at room temperature in excess of 5000 pounds per square inch and an apparent specific gravity at room temperature in excess of 3.04.

RUSSELL PEARCE HEUER.